(12) United States Patent  
Yang

(10) Patent No.: US 8,510,342 B1
(45) Date of Patent: Aug. 13, 2013

(54) AUTOMATIC CONVERSION OF BUILD PROCESSES TO USE STREAMING INPUT

(75) Inventor: Don Hsi-Yun Yang, Milpitas, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/239,980

(22) Filed: Sep. 22, 2011

(51) Int. Cl.
*G06F 7/00* (2006.01)
*G06F 9/45* (2006.01)

(52) U.S. Cl.
USPC .......................... 707/798; 717/140; 717/144

(58) Field of Classification Search
None
See application file for complete search history.

(56) References Cited

U.S. PATENT DOCUMENTS

| | | | | |
|---|---|---|---|---|
| 6,487,713 B1 * | 11/2002 | Cohen et al. | | 717/105 |
| 7,426,721 B1 * | 9/2008 | Saulpaugh et al. | | 717/144 |
| 7,640,533 B1 * | 12/2009 | Lottero et al. | | 717/108 |
| 2004/0221288 A1 * | 11/2004 | Lisitsa et al. | | 718/100 |
| 2008/0250390 A1 * | 10/2008 | Feblowitz et al. | | 717/114 |
| 2009/0063583 A1 * | 3/2009 | Bar-Or et al. | | 707/203 |
| 2010/0042974 A1 * | 2/2010 | Gutz et al. | | 717/121 |

OTHER PUBLICATIONS

"About Netpbm" [online]. [Retrieved Sep. 22, 2011] Retrieved from the internet: <http://netpbm.sourceforge.net>, 5 pages.

* cited by examiner

*Primary Examiner* — Pierre Vital
*Assistant Examiner* — David T Brooks
(74) *Attorney, Agent, or Firm* — Honigman Miller Schwartz and Cohn LLP

(57) ABSTRACT

Systems and methods are provided wherein executable files are prepared from source code without generating intermediate files. For example, rather than using a compiler to prepare an intermediate file that is then used by a linker, the compiler may stream its output directly to the linker, thus enabling the linker to perform its functions in parallel with the compiler. The system may also use a data streaming facility, such as a pipe, to stream data between the compilation and linking processes.

29 Claims, 9 Drawing Sheets

Fig. 1
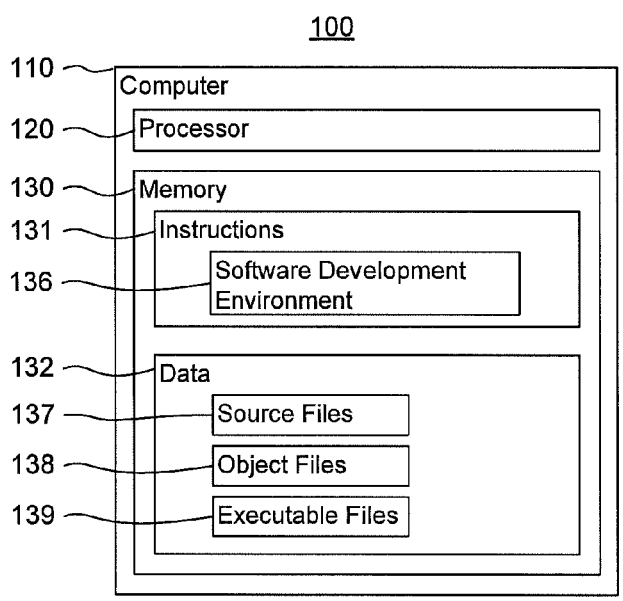
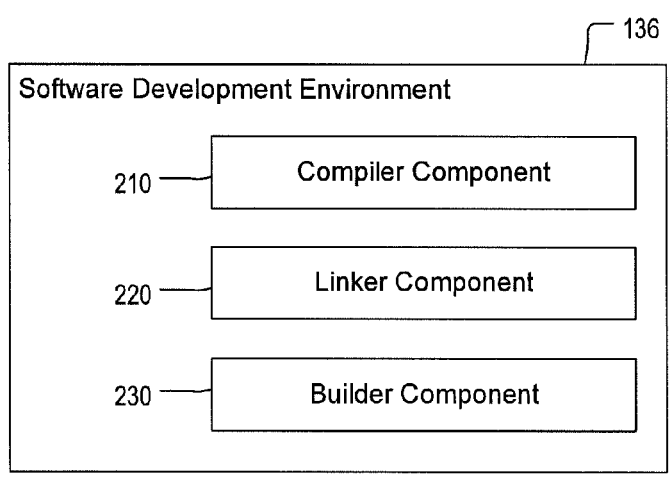
Fig. 2

300

320a — exectable_file: object_file_1 object_file_2
330a — cc object file_1 object file_2 -exectuable file 320b — object_file_1: object_file_3:
330b — cc object file_3 object file_1

320c — object_file_2: object_file 3
330c — cc object file_3 object file_2

320d — object_file_3: source
330d — cc -c source -object file 3

Fig. 3

AUTOMATIC CONVERSION OF BUILD PROCESSES TO USE STREAMING INPUT

BACKGROUND

Executable files are typically built from source code. Building executable files often involves, first, using a compiler to convert source code files into object files, and then, using a linker to combine the object files into an executable file, such as executable programs or libraries of routines called by programs.

Software utilities may be used to manage this process. These utilities, which are sometimes referred to as "builders," coordinate the operation of compilers, linkers, and other tools involved in the building of software. The order in which operations are performed by these tools is specified in lists of dependencies or commands that are processed by the builder.

For example, a builder may process a dependency specification that looks very similar to the following example:

Command 1: create object_file_1 from source_file_1.

Command 2: create object_file_2 from source_file_2;

Command 3: combine object_file_1 and object_file_2 to produce an executable file.

When the builder invokes command 1 and command 2, they are executed by a compiler and result in object_file_1 and object_file_2 being created from source code. The third command, when invoked by the builder, is executed by a linker and results in the object files being combined into an executable file. Thus, the third command is said to depend on the first two, and therefore, the first two commands are executed before the third.

SUMMARY

In accordance with one aspect, a method is provided for building a target comprising converting build dependencies into a graph having a starting node that corresponds to software that is being built and a plurality of other nodes corresponding to intermediate files that are used in building the software, identifying, using a processor, a first node that is connected to a second node in the graph, identifying a first command that is needed to build the first node and a second command that is needed to build the second node, and transforming the first command to output a data stream only if both the first command and second command are capable of working with data streams.

In accordance with one aspect, an apparatus comprising a memory and a processor, coupled to the memory. The processor executes a first command for building software as a first process, executes, concurrently with the first process, a second command for building the software that is dependent on the first command, wherein the second command is executed as a second process, and streams data necessary for the execution of the second command directly from the first process to the second process.

In accordance with one aspect of the disclosure, an apparatus comprising a memory and a processor, coupled to the memory. The processor receives a dependency specification for building software, wherein the dependency specification includes an indication of a file, replaces the indication of the file with an identification of a data stream to produce an improved dependency specification, and executes the improved dependency specification to build the software.

BRIEF DESCRIPTION OF THE DRAWINGS

FIG. 1 depicts a schematic diagram of a computer.

FIG. 2 is a schematic diagram of the architecture of development tool 136.

FIG. 3 depicts an example of a dependency script.

DETAILED DESCRIPTION

Figure 4:
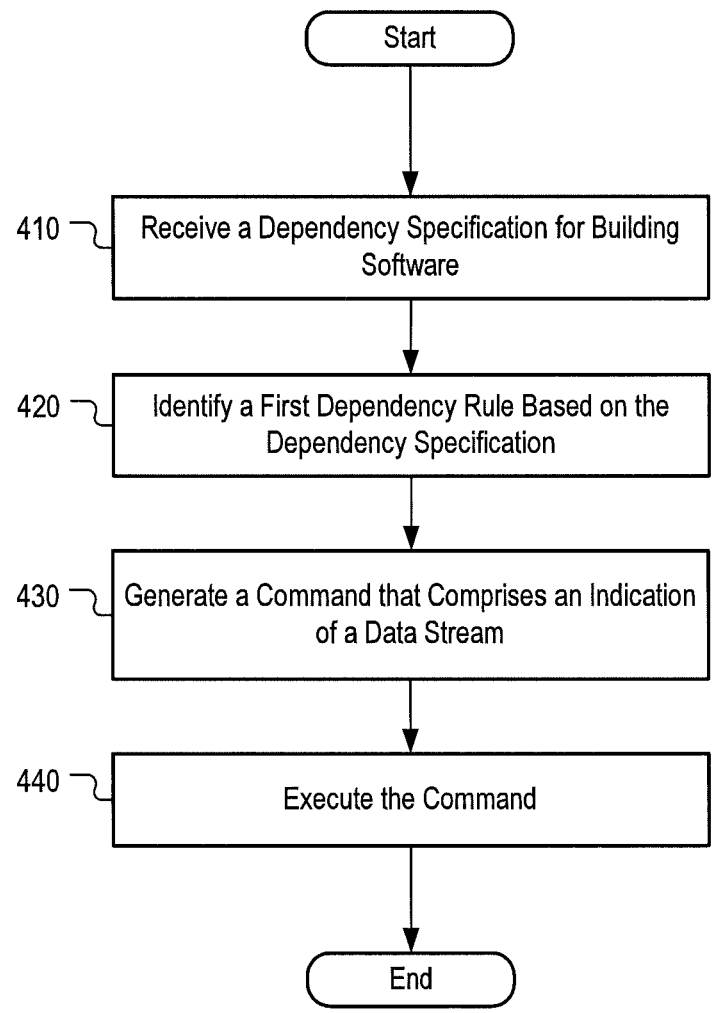
FIG. 4 depicts a flowchart of a process.

In one aspect, a system and method is provided wherein executable files are prepared from source code without generating intermediate files. For example, rather than using a compiler to prepare an intermediate file that is then used by a linker, the compiler may stream its output directly to the linker, thus enabling the linker to perform its functions in parallel with the compiler. The system may also use a data streaming facility, such as a pipe, to stream data between the compilation and linking processes.

In another aspect, a system and method is provided wherein two dependent commands for building of software are linked to one another via a data stream, such as pipe for example. The two dependent commands are executed as concurrent processes, with an intermediate file, such as an object file for example, being streamed from one process to the other.

As shown in FIG. 1, an exemplary system 100 may include computer 110. Computer 110 may contain a processor 120, memory 130 and other components typically present in general purpose computers. Computer 110 may be a personal computer, server, mainframe, laptop, desktop, cell phone, or any other processor-based computing device.

Memory 130 of computer 110 stores information accessible by processor 120, including instructions 131 that may be executed by the processor 120. The memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Some of instructions 131 may be part of a software development environment 136. Software development environment 136 may be an integrated development environment (IDE) or a collection of independent programs for creating software such as a combination of Make, GCC, and Emacs, for example. Software development environment 136 may include compiler(s), linker(s), and builder(s).

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. In particular, the data may comprise information that is used in the building of software, such as source code, object code, and executable files.

Source files 137 may include one or more files containing instructions written in a programming language such as, for example, C and C++. Source files 137 may be produced manually by human programmers or they can be automatically generated by software development environment 136. Object files 138 may contain named sequences of processor-executable machine code. Object files 138 may be generated from source files by software development environment 136. Executable files 137 may include programs such as ".exe" or other files that are executable by the operating system of computer 110. Also, executable files 137 may include libraries for use by other programs, such as, dynamically linked libraries.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

FIG. 2 is a schematic diagram of the architecture of software development environment 136. Software development environment 136 may include compiler component 210, linker component 220, and builder component 230. In operation, compiler component 210 accepts source code files as input and converts them into object files. The object files are intermediate files that can be combined by linker component 220 to produce an executable file. The order in which the services of compiler component 210 and linker component 220 are invoked may be controlled by builder component 230.

Builder component 230 may be an application component or a freestanding application. Builder component 230 coordinates the operation of compiler component 210 and linker component 220 in accordance with a dependency specification.

FIG. 3 depicts a high-level example of a dependency specification. Dependency specification 300 may contain dependency rules 320*a-d*, command lines 330*a-d*, or both. Dependency specification 300 can be of any syntax, type, and format. Moreover, dependency specification 300 may be a script that is executable by a software builder, such as a makefile, or just a list of one or more dependencies between different data involved in the building of software, such as, for example, source code files, object files, and executable files.

Dependency rule 320 identifies a relationship between at least one target and one or more prerequisites. It may have the syntax of "<target>: <prerequisite 1, prerequisite N>." The target may be an object file, executable file, source file, or any other data that is the produced by a software tool involved in the building of software. The prerequisites correspond to data that is needed to produce the target. For example, in dependency rule 320*a*, the target file is executable file and the prerequisites are object_file__1 and object_file__2.

Command 330*a-d* may be a command for a compiler, linker, or another software tool involved in the building of software. It may include one or more input parameters, one or more output parameters, or both input and output parameter(s). For example, command 330*a* uses object_file__1 and object_file__2 as input parameter and "executable_file" as output. As another example, command 330*b* uses object_file__3 as input parameter and outputs object_file__1.

Commands 330*a* and 330*b* may be executed as concurrent processes. The data constituting object_file__1 is streamed from the process executing command 330*b* directly to the processes executing command 330*a*. The streaming can be accomplished by using pipes, named or unnamed, or a similar technique. For example, pipes may be used to connect processes so that the output of one process feeds into the next one. The pipes may be inter-process communication channels that use data streams to transport information.

FIG. 4 depicts a flowchart of a process. The process may be executed by processor 110. In one example, the process includes the following tasks:

410—Obtain a dependency specification.
    420—Identify a first dependency rule based on the dependency specification.
    430—Generate, based on the first dependency rule, a command that includes an indication of a data stream.
    440—Execute the command.

At task 410, a dependency specification is obtained. In the present example, dependency specification 300 is obtained.

At task 420, a first dependency rule is identified based on the dependency specification. In the illustrative embodiment, dependency rule 320*b* is selected. If dependency rules are defined explicitly in the dependency specification, as is the case with dependency specification 300, the dependency rule is identified by reading the dependency specification and selecting one of the rules identified in it. However, if the dependency rules are defined implicitly, one or more commands in the dependency specification may be processed to derive the dependency rule.

At task 430, a command that comprises an indication of a data stream is generated based on the dependency specification. The indication of data stream may be an identification of a named pipe, an indication of an unnamed pipe or any other indication of a data stream. Task 430 is further described in the discussion with respect to FIG. 5.

At task 440, the command generated at task 430 is executed to produce, at least in part, an executable file, such as a program or a software library for use by programs.

It should be noted that tasks 410-440 are provided as an example. In some aspects of the system and method, at least some of the tasks associated with FIG. 4 may be performed in a different order than represented or performed concurrently. In other aspects, some of tasks 410-440 may be altogether omitted.

Figure 5:
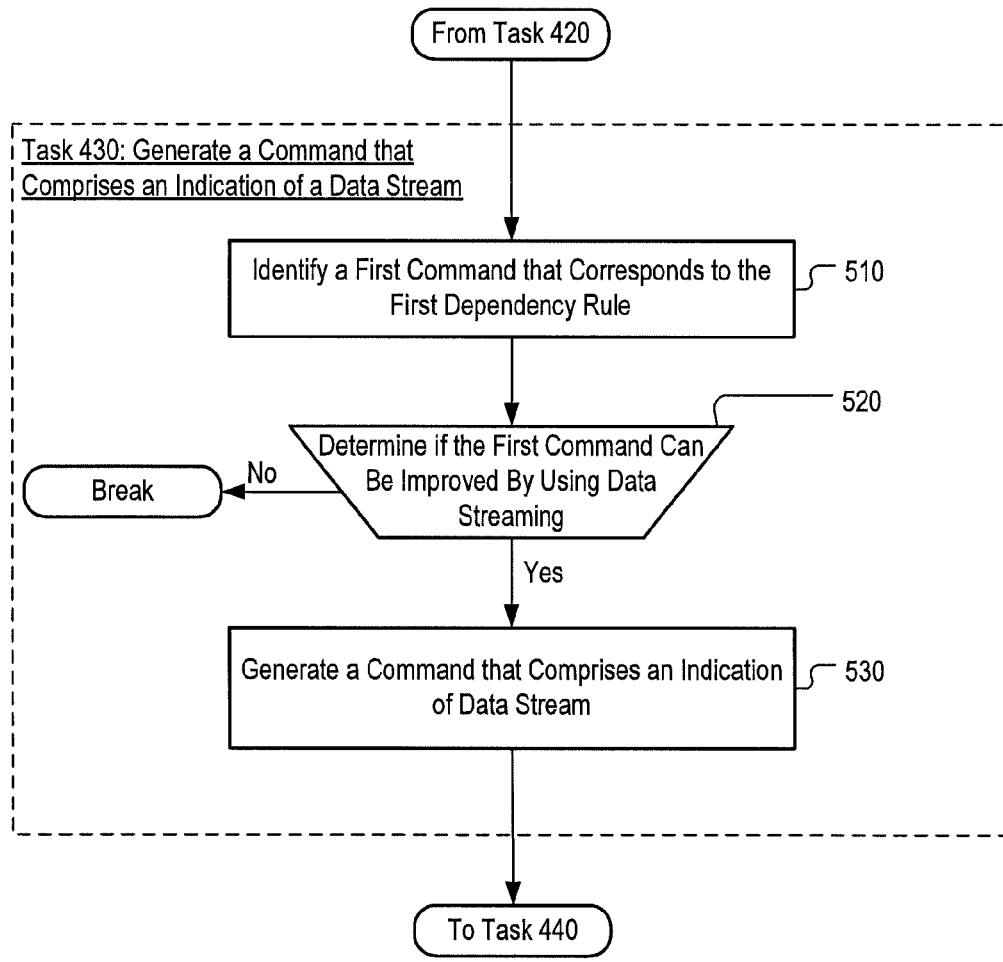
FIG. 5 is a flowchart of the execution of the subtasks associated with task 430.

FIG. 5 is a flowchart of the execution of subtasks associated with task 430. Task 430 relates to generating a command that comprises an indication of a data stream. In one example, task 430 includes the following subtasks.

510—Identify the first command.

520—Determine if the first command can be improved.

530—Include an indication of a data stream in the first command.

At task 510, a first command that corresponds to the first dependency rule is identified. The first command is any command for a compiler, linker or another software tool involved in the building of software. For example, command 330b is identified.

A command corresponding to a specific dependency rule may be any command that is part of the same operation as the dependency rule. Alternatively, a command corresponding to a specific dependency rule may be any command that: (i) receives an input parameter corresponding to a prerequisite in the dependency rule and/or (ii) an output parameter corresponding to a target of the dependency rule.

In situations where the dependency specification contains both commands and dependency rules, the corresponding command may be determined by reading the dependency specification to identify a command that corresponds to the same operation as the first dependency rule. Alternatively, the corresponding command may be identified by processing the dependency specification to automatically generate one or more commands.

At task 520, it is determined whether the first command can be improved by using data streaming. Upon a positive determination, task 530 is executed. Otherwise, the execution of the process of FIG. 4 is either stopped or restarted with a new dependency rule being selected at task 420.

At task 530, a command is created that includes an indication of a data stream. When the command line is executed, data corresponding to a target in the first dependency rule (which corresponds to the first command) is output as a data stream rather than being saved as a file.

It should be noted that tasks 510-530 are provided as an example. In some embodiments, at least some of the tasks associated with FIG. 5 may be performed in a different order than represented or performed concurrently. Furthermore, in some embodiments, at least some of tasks 510-530 may be altogether omitted.

Figure 6:
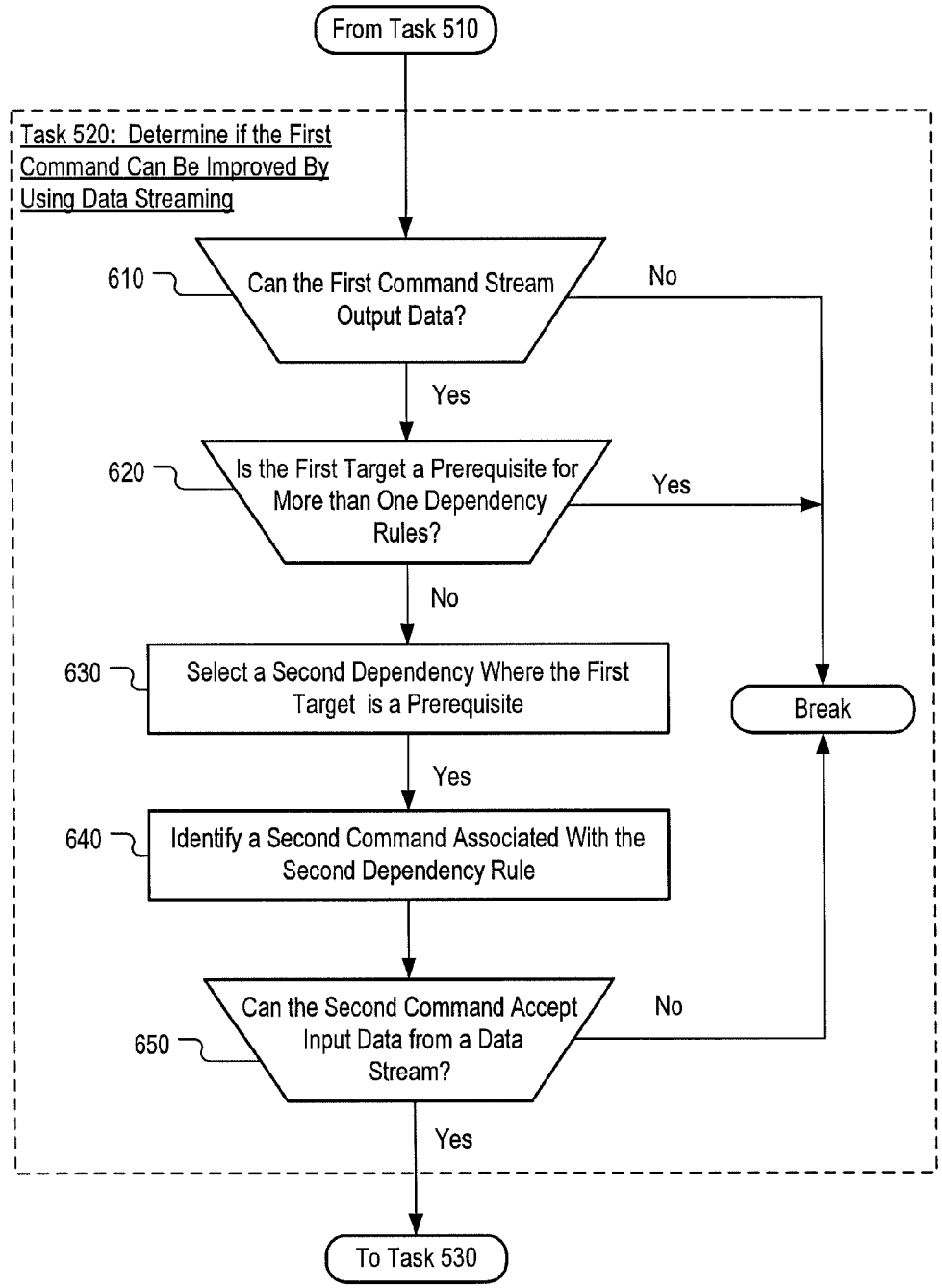
FIG. 6 is a flowchart of the execution of the subtasks associated with task 520.

FIG. 6 is a flowchart of the execution of the subtasks associated with task 520. As noted above, task 520 may involve determining whether the execution of the first command can be improved by using data streaming. In one example, task 520 includes the following subtasks.

610—Determine if the first command can work with data streams.

620—Determine if the first target is a prerequisite for more than one dependency rules.

630—Identify a second dependency rule where the first target is a prerequisite.

640—Identify a second command that corresponds to the second dependency rule.

650—Determine whether the second command can work with pipes.

The process of FIG. 6 includes three tests performed at tasks 610, 620, and 650, respectively. In some embodiments, if any of these tests fails, the execution of the process of FIG. 4 is either stopped or restarted with a new dependency rule being selected at task 420. Otherwise, if the test is passed, the execution of the process proceeds to the next task.

At task 610, it is determined whether the first command can work with data streams. The first command may be considered to be capable of working with data streams if the first command, as implemented by underlying software (e.g. compiler, linker) is capable of interfacing with one or more available pipe implementations. For example, a table may be consulted that identifies whether the first command is capable of working with one or more available pipe implementations. At task 620, it is determined whether the first target of the first dependency rule (identified at task 420) is used as a prerequisite in more than one other dependency rules found in dependency specification 300. In the illustrative embodiment, object_file__1 is a prerequisite only in dependency rule 320a. Therefore, object_file__1 passes the test. To fully illustrate the concept, it should be noted also that object_file__3, which is the target in rule 320d, would not pass this test as object_file__3 is a prerequisite in two dependency rules—dependency rules 320b and 320c.

If the first target is a prerequisite for more than one dependency rules, then multiple commands exist, each corresponding to a different dependency rule and using data corresponding to the first target as input. Because each command process may consume input at a different speed, in some embodiments, the use of pipes may be limited only to targets that are prerequisites to no more than one command.

In other embodiments, in response to determining that the first target is used as a prerequisite in more than one dependency rules, an intermediate processes is initiated. The intermediate process: (i) buffers data corresponding to the first target that is sent over a pipe and (ii) feeds the buffered data to processes associated with commands that use the first target as an input.

At task 630, a second dependency rule, that uses the first target as a prerequisite, is determined. In the illustrative embodiment, rule 320a is selected because object_file__1—the target in dependency rule 320b—is a prerequisite in dependency rule 320a. The second dependency rule may be identified by reading the dependency specification and selecting rule that meets the above criterion. In addition, the dependency rule may be identified by building a dependency graph for the specification and identifying an edge that is connected to a node representing the first target. Moreover, selecting the second dependency rule may involve processing command(s) found in dependency specification 300 (e.g. compiler commands and linker commands) to derive the second dependency rule.

At task 640, a second command corresponding to the second dependency rule is identified. The second command may be a command for a compiler, linker or another software tool involved in the building of software. In the illustrative embodiment, the second command is command 330-1.

A command corresponding to a specific dependency rule may be any command that is part of the same operation as the dependency rule. Alternatively, a command corresponding to a specific dependency rule may be any command that: (i) receives an input parameter corresponding to a prerequisite in the dependency rule and/or (ii) an output parameter corresponding to a target of the dependency rule.

In situations where the dependency specification contains both commands and dependency rules, the corresponding command may be determined by reading the dependency specification to identify a command that corresponds to the same operation as the second dependency rule. Alternatively, the corresponding command may be identified by processing the dependency specification to automatically generate one or more commands.

At task 650, it is determined whether the second command can work with data streams. The second command may be considered to be capable of working with data streams if the second command, as implemented by underlying software (e.g. compiler, linker) is capable of interfacing with one or more available pipe implementations. For example, a table may be consulted that identifies whether the first command is capable of working with one or more available pipe implementations.

It should be noted that tasks 610-650 are provided as an example. In some embodiments, at least some of the tasks associated with FIG. 6 may be performed in a different order than represented or performed concurrently. Furthermore, in some embodiments, at least some of tasks 610-650 may be altogether omitted.

Figure 7:
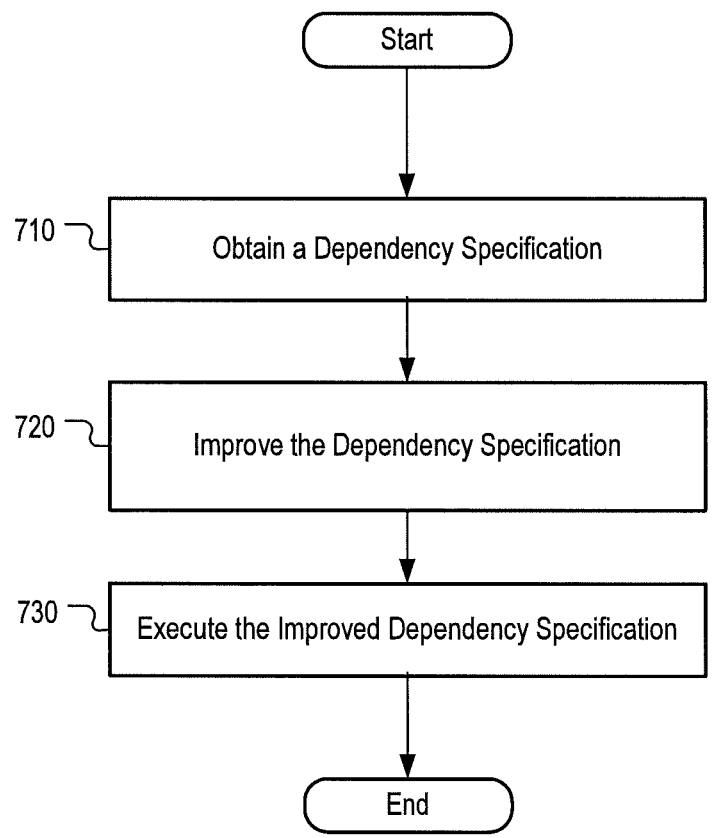
FIG. 7 depicts a flowchart of a process.

FIG. 7 depicts a flowchart of a process. The process may be executed by processor 110 or by a plurality of processors. In one example, the process includes the following tasks:

710—Obtain a dependency specification.
    720—Process the dependency specification to produce an improved dependency specification.
    730—Execute the improved dependency specification.

At task 710, a dependency specification is obtained. In the illustrative embodiment, dependency specification 300 is obtained.

At task 720, dependency specification 300 is processed to produce an improved dependency specification. Task 720 is further described in the discussion with respect to FIG. 8.

At task 730, the improved dependency specfication is executed. Task 730 is further described in the discussion with respect to FIG. 9.

It should be noted that tasks 710-730 are provided as an example. In some aspects of the system and method, at least some of the tasks associated with FIG. 7 may be performed in a different order than represented or performed concurrently. Furthermore, in other aspects, at least some of tasks 710-730 may be altogether omitted.

Figure 8:
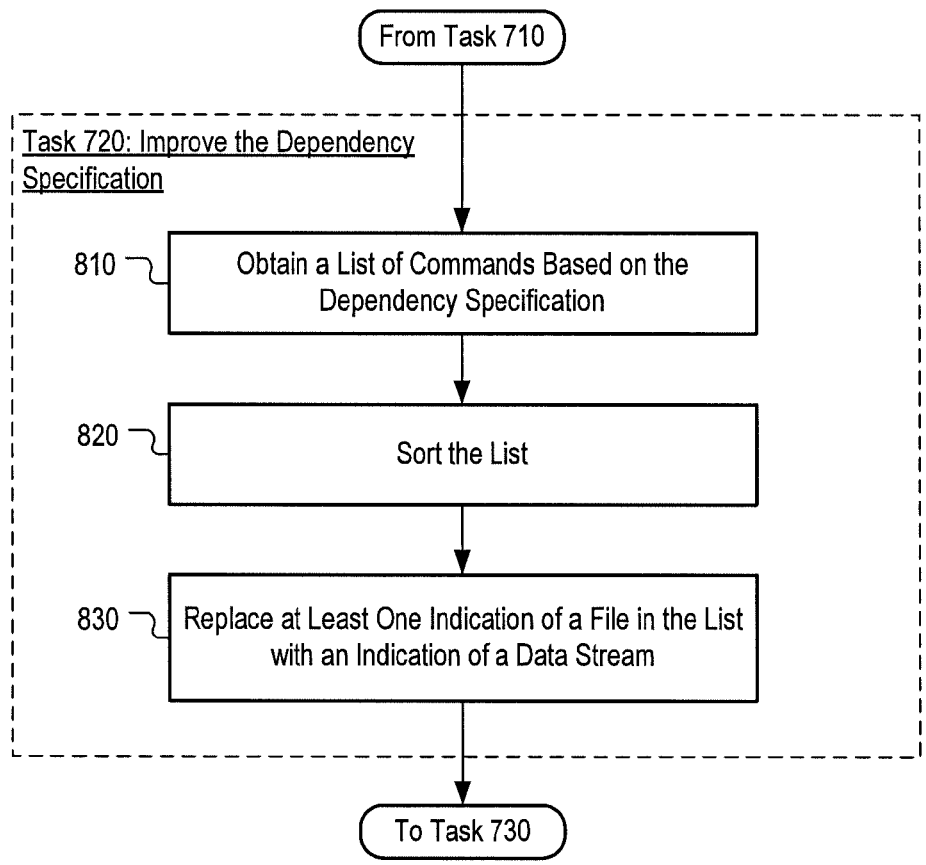
FIG. 8 is a flowchart of the execution of the subtasks associated with task 720.

FIG. 8 is a flowchart of the execution of the subtasks associated with task 720. It will be recalled that task 720 involves improving the dependency specification. In one example, task 720 includes the following subtasks:

810—Obtain a list of operations.
    820—Sort the list.
    830—Replace an indication of a file with an indication of a pipe.

At task 810, a list of operations is obtained from dependency specification 300. The list may be obtained by reading dependency specification 300 and extracting commands 330*a-d*. Or it may be involved by processing dependency rules 320*a-d* derive a set of commands that are executable by compilers, linkers, and other tools involved in the building of software.

At task 820, the list of operations is sorted. The list may be sorted by using topological sorting or another sorting algorithm.

The sorting of the list results in a sorted list being produced where the operations are ordered according to the order in which they may be executed—with those operations that can be executed earlier being at the top of the list.

In embodiments where topological sorting is used, at least some of the following tasks may be executed:

T1: Produce a dependency graph.
    T2: Traverse the graph depth-first.
    T3: Produce a list of graph edges, wherein the edges are listed in the order in which they are passed during the depth-first traversal.
    T4: Remove duplicates for the list.

Figure 10:
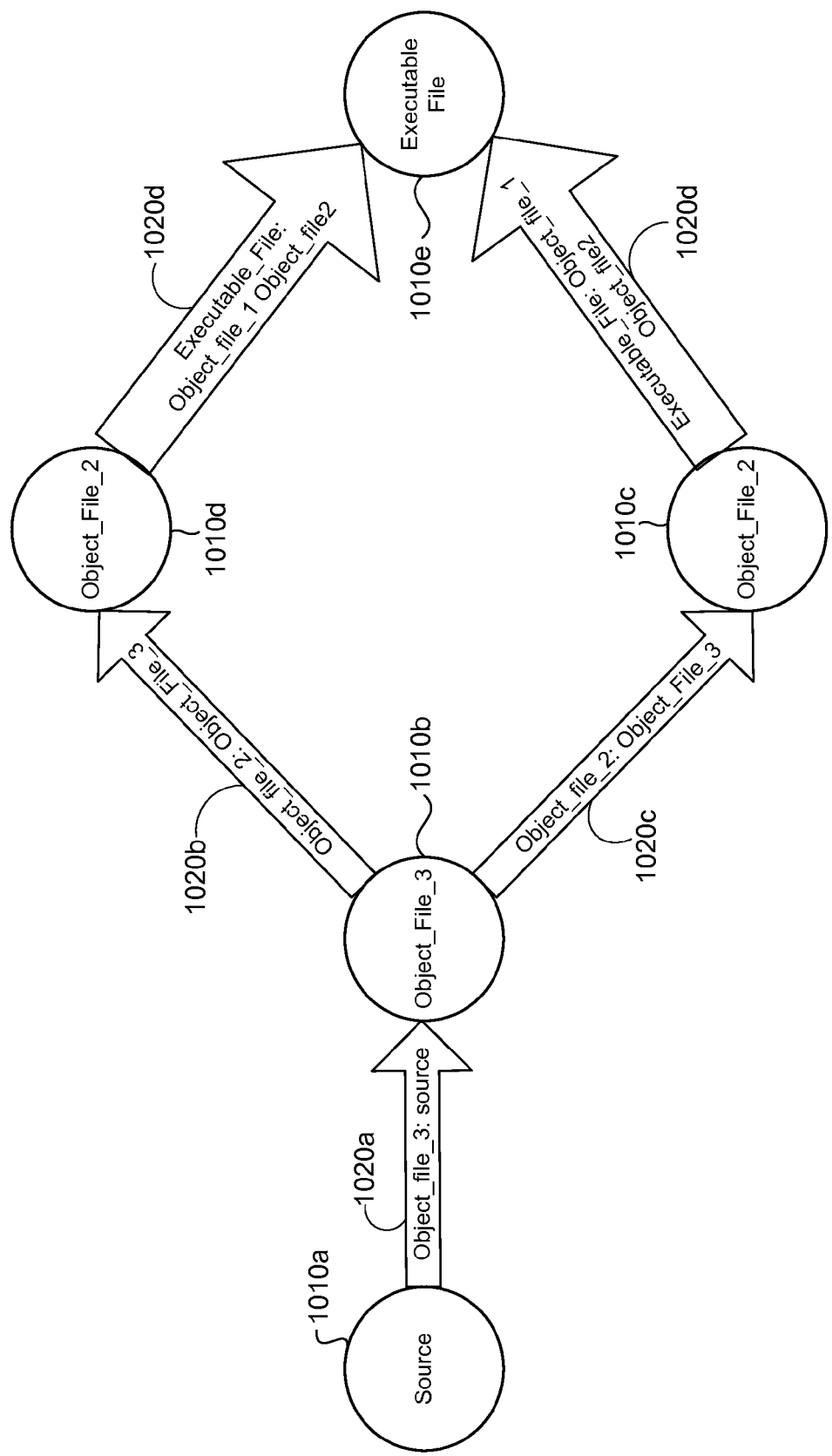
FIG. 10 depicts an example of a dependency graph.

Regarding dependency graphs, FIG. 10 depicts one example of a dependency graph for dependency specification 300. As illustrated, the nodes 1010*a-e* in the graph correspond to different targets/prerequisites that are identified in dependency specification 300 and the edges 1020*a-e* correspond to the specification's dependency rules.

The dependency graph for dependency specification 300 is may be traversed depth-first to produce a list of edges. Traversing the graph in FIG. 10 depth-first yields the following list:

```
object_file_3: source
    cc -c source -object_file_3
object_file_1: object_file_3:
    cc object_file_3 object_file_1
object_file_2: object_file_3
    cc object file_3 object file_2
executable_file: object_file_1 object_file_2
    cc object file_1 object file_2 -executable file
executable_file: object_file_1 object_file_2
    cc object_file_1 object file_2 -executable_file
```

After duplicates are removed, the resultant list becomes:

```
object_file_3: source
    cc -c source -object_file_3
object_file_1: object_file_3:
    cc object_file_3 object_file_1
object_file_2: object_file_3
    cc object_file_3 object_file_2
executable_file: object_file_1 object_file_2
    cc object_file_1 object file_2 -executable file
```

At task 830, an indication of a file in dependency specification 300 is replaced with an indication of a data stream. The indication of a data stream may be a pipe name or an indication of an unnamed pipe. In one example, the indication of a file is replaced with an indication of a data stream only if it passes a set of three tests (hereinafter "tests 1-3").

Test 1: To pass test 1, a file cannot be used as an input parameter to more than one command.

Test 2: To pass test 2, a file has to be generated by a command that is capable of working with streams.

Test 3: To pass test 3, a file has to be used as input to a command that is capable of working with streams.

Applying tests 1-3 to the list of operations obtained at task 810 yields the following results. Object_file_3 is not replaced with a data stream because it is used as input in two command lines. Object_file_1 and object_file_2, on the other hand, are replaced with data streams because they pass all three tests. As a result of applying tests 1-3, the following list of updated commands is produced:

```
object_file_3: source
    cc -c source -object_file_3
object_file_1: object_file_3:
    cc object_file_3 pipe_1
object_file_2: object_file_3
    cc object_file_3 pipe_2
executable_file: object_file_1 object_file_2
    cc pipe_1 pipe_2 -executable_file
```

The tests may be applied to the dependency graph depicted in FIG. 10. For example, pairs of nodes that are connected to each other may be identified, and for each node in the pair, it is determined whether the node satisfies at least some of tests 1-3. For instance, test 1 may be performed by determining whether a node is related to multiple outgoing edges. If there are multiple edges stemming from the node, then the node is a prerequisite for more than one dependency rule and therefore fails test 1.

It should be noted that tasks 810-830 are provided as an example. In some embodiments, at least some of the tasks associated with FIG. 8 may be performed in a different order than represented or performed concurrently. Furthermore, in some embodiments, at least some of tasks 810-830 may be altogether omitted.

Figure 9:
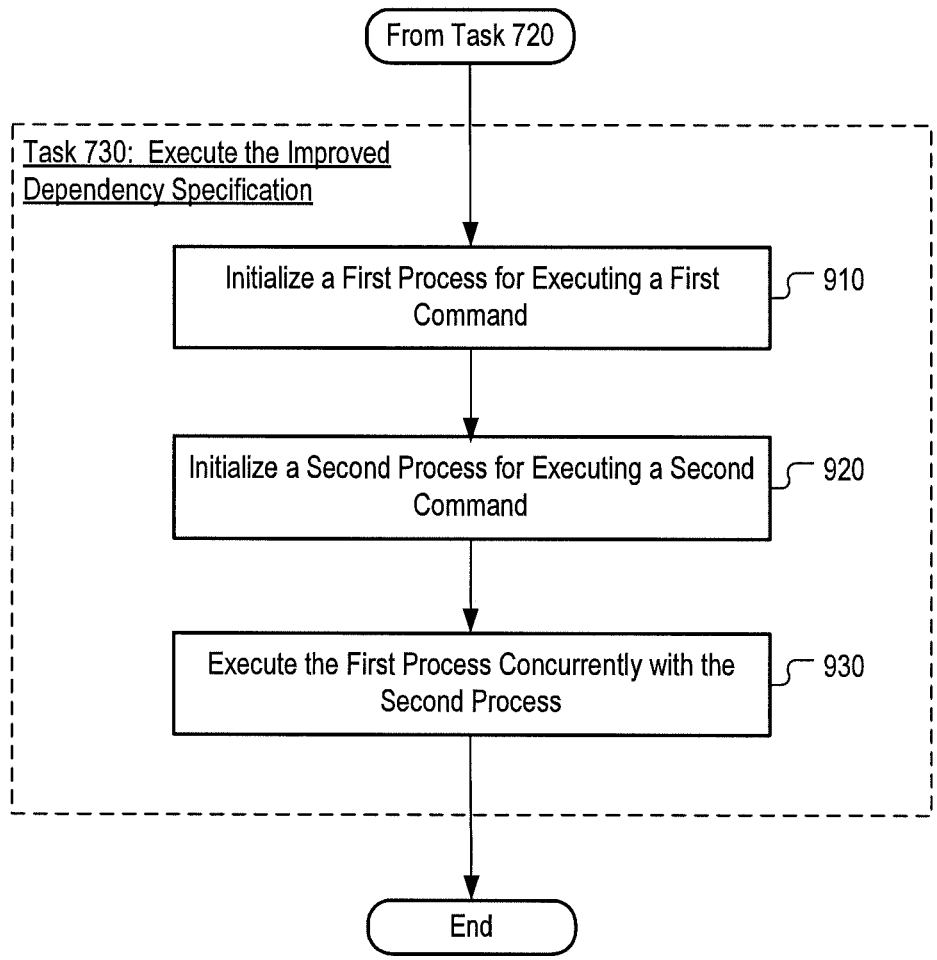
FIG. 9 is a flowchart of the execution of the subtasks associated with task 730.

FIG. 9 is a flowchart of the execution of two subtasks associated with task 730 in accordance with one aspect of the disclosure. It will be recalled that task 730 involves executing the improved dependency specification. In one example, task 730 includes the following subtasks.

910—Initialize a first process for executing a first command.

920—Initialize a second process for executing a second command.

930—Execute the first process concurrently with the second process.

At task 910, a first process is initialized for executing a first command. The initialized process may be a process, thread or any unit of application or kernel scheduling. In the illustrative embodiment, the first command is "cc object_file_3 pipe_1."

At task 920, a second process is initialized for executing a second command. The initialized process may be a process, fiber, thread or any unit of application or kernel scheduling. In the illustrative embodiment, the second command is "cc object_file_3 pipe_2."

At task 930, at the first process is executed concurrently with the second process. The output of the execution of the first processes is streamed directly into the second process. The output may be streamed by using pipes. Because the commands are executed concurrently, the dependency specification (received at task 710) may take less time to execute than it would have taken without the optimization. Furthermore, because a pipe is used to stream the data constituting object_file_1, the system and method may avoid storing a file representation of object_file_1.

It should be noted that tasks 910-930 are provided as an example. In some aspects, at least some of the tasks associated with FIG. 9 may be performed in a different order than represented or performed concurrently. Furthermore, in some aspects, at least some of tasks 910-930 may be altogether omitted.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for building a target, the method comprising:
generating, using a processor, a graph from software build dependencies, wherein the graph has a starting node that corresponds to software that is being build and a plurality of other nodes corresponding to intermediate object files that are used in building the software;
identifying, using a processor, a first node that is connected to a second node in the graph;
identifying a first command that is needed to build the first node and a second command that is needed to build the second node, both commands comprising software build commands;
receiving a determination of whether the first and second commands are capable of working with data streams based on whether the first and second commands can interface with at least on pipe;
transforming the first command to output a data stream when it is determined that both the first command and second command are capable of working with data streams;
failing to modify the second command to accept the data stream from the first command as input when it is determined that one of the first and second commands is incapable of working with data streams; and
wherein the first node is a prerequisite for the second node, and the command is transformed only when the first node is a prerequisite for a node in the graph.

2. The method of claim 1, further comprising modifying the second command to accept the data stream from the first command as input when it is determined that both the first command and second command are capable of working with data streams.

3. The method of claim 1, wherein the first command is transformed to output the data stream by using a named pipe.

4. The method of claim 1, wherein the first command is transformed to output the data stream by using an unnamed pipe.

5. The method of claim 1, wherein the software that is built is one of an executable program and a software library.

6. The method of claim 1, wherein the first command is executable by at least one of a compiler and linker.

7. The method of claim 1, wherein the second command is executable by at least one of a compiler and linker.

8. The method of claim 1, wherein the first command is a command for a compiler and the second command is a command for a linker.

9. The method of claim 1, wherein the second node is a target node.

10. An apparatus comprising:
a memory; and
a processor, coupled to the memory, that:
executes a first command for building software as a first process;
executes, concurrently with the first process, a second command for building the software, wherein the second command is executed as a second process;
streams object code that is used as an input by the second command directly from the first process to the second process;
converts the software build dependencies for building the software into a graph, the graph having a starting node that corresponds to the software that is being built and a plurality of other nodes corresponding to intermediate files that are used in building the software
identifies a first node that is connected to a second node in the graph, wherein the first command is needed to build the first node and the second command is needed to build the second node;
receives a determination of whether the first and second commands are capable of working with data streams based on whether the first and second commands can interface with at least on pipe;
transforms the first command to output a data stream when it is determined that both the first command and second command are capable of working with data streams;
fails to modify the second command to accept the data stream from the first command as input when it is determined that one of the first and second commands is incapable of working with data streams; and wherein the first node is a prerequisite for the second node, and the command is transformed only when the first node is a prerequisite for a node in the graph.

11. The apparatus of claim 10, wherein the software is a program and the first command is for building the program.

12. The apparatus of claim 10, wherein the software is a software library and the first command is for building the software library.

13. The apparatus of claim 10, wherein the intermediate file data is object file data that is produced by the first process as a result of executing the first command.

14. The apparatus of claim 10, wherein the first command is a compiler command and the second command is a linker command.

15. The apparatus of claim 10, wherein the processor selects the first command and the second command to be executed concurrently by analyzing a graph that is built based on dependency specification for building the software.

16. The apparatus of claim 10, wherein the processor converts a first dependency specification into a second dependency specification that includes the first command and the second command while the first dependency specification excludes the first command and the second command.

17. An apparatus comprising:
a memory; and
a processor, coupled to the memory, that:
receives a dependency specification for building software, wherein the dependency specification includes an indication of a file;
replaces the indication of the file with an indication of a data stream to produce an improved dependency specification;
executes the improved dependency specification to build the software;
replaces the indication of the file with an indication of a data stream only when the file is a prerequisite for no more than one dependency rule identified in the dependency specification;
fails to replace the indication of the file with the indication of the data stream when a software build command, that is set to receive the file as input by the dependency specification for building the software, is incapable of working with pipes; and
wherein the indication of the file is a prerequisite for a second dependency rule, and
the indication of the file is replaced only when the file is a prerequisite for a dependency rule in the dependency specification.

18. The apparatus of claim 17, wherein the indication of the file is replaced with the indication of the data stream only when a command, that is set to receive the file as input by the dependency specification for building the software, is capable of working with pipes.

19. The apparatus of claim 17, wherein the file is an object file.

20. The apparatus of claim 17, wherein the software is an executable file and the dependency specification is for building the executable file.

21. The apparatus of claim 17, wherein the software is a software library and the dependency specification is for building the software library.

22. The apparatus of claim 17, wherein the software is an object file and the dependency specification is for building the object file.

23. The apparatus of claim 17, wherein the dependency specification is executable by an automated building tool.

24. The apparatus of claim 17, wherein the dependency specification is a makefile.

25. The apparatus of claim 17, wherein the dependency specification excludes command lines that are executable by at least one of compilers and linkers.

26. The apparatus of claim 17, wherein the indication of the data stream is an identification of a data stream.

27. The apparatus of claim 17, wherein the indication of the data stream is a pipe name.

28. The apparatus of claim 17, wherein the dependency specification comprises one or more dependency rules.

29. The apparatus of claim 17, wherein the dependency specification comprises one or more commands that are executable by one of a compiler, linker, or any other tool for building software.

* * * * *